United States Patent
Sapozhnikov et al.

(10) Patent No.: US 9,082,424 B2
(45) Date of Patent: Jul. 14, 2015

(54) SIDE SHIELD BIASING LAYER SEPARATED FROM AN AIR BEARING SURFACE

(71) Applicant: Seagate Technology LLC, Cupertino, CA (US)

(72) Inventors: Victor Boris Sapozhnikov, Minnetonka, MN (US); Mohammed Shariat Ullah Patwari, Eden Prairie, MN (US); Shaun Eric McKinlay, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/333,287

(22) Filed: Jul. 16, 2014

(65) Prior Publication Data

US 2014/0327989 A1  Nov. 6, 2014

Related U.S. Application Data

(63) Continuation of application No. 13/687,855, filed on Nov. 28, 2012, now Pat. No. 8,854,773.

(51) Int. Cl.
| | | |
|---|---|---|
| *G11B 5/31* | (2006.01) | |
| *G11B 5/11* | (2006.01) | |
| *G11B 5/10* | (2006.01) | |
| *G11B 5/39* | (2006.01) | |

(52) U.S. Cl.
CPC .. *G11B 5/11* (2013.01); *G11B 5/10* (2013.01); *G11B 5/31* (2013.01); *G11B 5/398* (2013.01); *G11B 5/3912* (2013.01); *G11B 5/3932* (2013.01)

(58) Field of Classification Search
CPC .......... G11B 5/31; G11B 5/84; G11B 5/8404; G11B 5/85
USPC .......... 360/235.2–235.7, 245.3, 319
See application file for complete search history.

(56) References Cited

U.S. PATENT DOCUMENTS

| | | | |
|---|---|---|---|
| 6,018,862 A | 2/2000 | Stageberg et al. | |
| 6,456,467 B1 | 9/2002 | Mao et al. | |
| 6,525,913 B1 * | 2/2003 | Mauri et al. | 360/320 |
| 6,760,966 B2 | 7/2004 | Wang et al. | |
| 6,914,759 B2 | 7/2005 | Chen et al. | |
| 7,130,165 B2 | 10/2006 | Macken et al. | |
| 7,193,815 B1 | 3/2007 | Stoev et al. | |
| 7,301,734 B2 | 11/2007 | Guo et al. | |
| 7,324,309 B1 | 1/2008 | Wiesen et al. | |
| 7,337,530 B1 | 3/2008 | Stoev et al. | |
| 7,349,179 B1 | 3/2008 | He et al. | |
| 7,599,151 B2 | 10/2009 | Hatatani et al. | |
| 7,869,165 B2 * | 1/2011 | Miyauchi et al. | 360/319 |
| 7,876,534 B2 | 1/2011 | Chou et al. | |
| 7,974,048 B2 | 7/2011 | Shimazawa et al. | |
| 8,089,734 B2 | 1/2012 | Miyauchi et al. | |

(Continued)

FOREIGN PATENT DOCUMENTS

| | | |
|---|---|---|
| EP | 2521122 A1 | 11/2012 |
| JP | 2005-346869 A | 12/2005 |
| JP | 2012-119053 A | 6/2012 |

*Primary Examiner* — Allen T Cao
(74) *Attorney, Agent, or Firm* — Hall Estill Attorneys at Law

(57) ABSTRACT

Various embodiments may configure a data storage device with at least a magnetic element having a magnetic stack that is configured with an air bearing surface (ABS) and is separated from a side shield. The side shield can be biased by a biasing layer that contacts the side shield and is separated from the ABS.

20 Claims, 4 Drawing Sheets

(56) References Cited

U.S. PATENT DOCUMENTS

| | | |
|---|---|---|
| 8,320,080 B1 | 11/2012 | Braganca et al. |
| 2001/0020847 A1* | 9/2001 | Mattheis et al. .......... 324/207.21 |
| 2003/0179517 A1* | 9/2003 | Horng et al. ............. 360/324.12 |
| 2004/0156148 A1 | 8/2004 | Chang et al. |
| 2005/0180064 A1* | 8/2005 | Cyrille et al. ............. 360/327.3 |
| 2005/0280959 A1 | 12/2005 | Guo et al. |
| 2006/0002018 A1* | 1/2006 | Fukui et al. ................... 360/125 |
| 2006/0132989 A1* | 6/2006 | Zhang et al. ............. 360/324.12 |
| 2009/0034132 A1* | 2/2009 | Miyauchi et al. ............. 360/324 |
| 2010/0027168 A1 | 2/2010 | Chou et al. |
| 2010/0085666 A1* | 4/2010 | Zhou et al. ............... 360/324.12 |
| 2011/0007426 A1 | 1/2011 | Qiu et al. |
| 2011/0051291 A1 | 3/2011 | Miyauchi et al. |
| 2011/0279923 A1 | 11/2011 | Miyauchi et al. |
| 2012/0026628 A1 | 2/2012 | Li et al. |
| 2012/0147504 A1* | 6/2012 | Zhou et al. ............... 360/324.12 |
| 2012/0275062 A1 | 11/2012 | Gao et al. |
| 2012/0281319 A1 | 11/2012 | Singleton et al. |
| 2012/0307404 A1 | 12/2012 | Braganca et al. |
| 2013/0164549 A1* | 6/2013 | Nishioka ....................... 428/469 |
| 2013/0182352 A1 | 7/2013 | Matsumoto et al. |

\* cited by examiner

SIDE SHIELD BIASING LAYER SEPARATED FROM AN AIR BEARING SURFACE

RELATED APPLICATION

This application is a continuation of copending U.S. patent application Ser. No. 13/687,855 filed on Nov. 28, 2012.

SUMMARY

Various embodiments are generally directed to a magnetic element capable of being incorporated into a data storage device.

In accordance with various embodiments, a magnetic element may have a magnetic stack that is configured with an air bearing surface (ABS) and is separated from a side shield. The side shield can be biased by a biasing layer that contacts the side shield and is separated from the ABS.

DETAILED DESCRIPTION

With data storage devices continually striving for more data capacity and faster data access rates, data storage components have reduced in size to accommodate smaller form factor data storage environments. In rotating data storage environments, increased areal bit density can provide greater data capacity, but may have difficulty differentiating specific data bits, especially in minimized data track pitch configurations. The introduction of side shields on laterally adjacent sides of a magnetic stack can increase data track resolution while reducing noise and optimizing magnetic performance.

However, positioning one or more side shields proximal a magnetic stack may pose operational difficulties in situations where magnetization of the side shield adversely affects the magnetic stack, such as by creating magnetic instability and increased magnetic asymmetry. Thus, reliable data resolution in reduced form factor data storage devices is keyed to the magnetic stabilization of side shields.

With these concerns in mind, a magnetic element can be configured with a magnetic stack having an air bearing surface (ABS) and separated from a side shield that is biased by a biasing layer contacting the side shield and separated from the ABS. The ability to tune the position, size, and biasing characteristics of the biasing layer allows for stabilization of magnetization in the side shield, which translates to optimized performance of the magnetic stack without adding to the shield-to-shield spacing of the magnetic element on the ABS.

Figure 1:
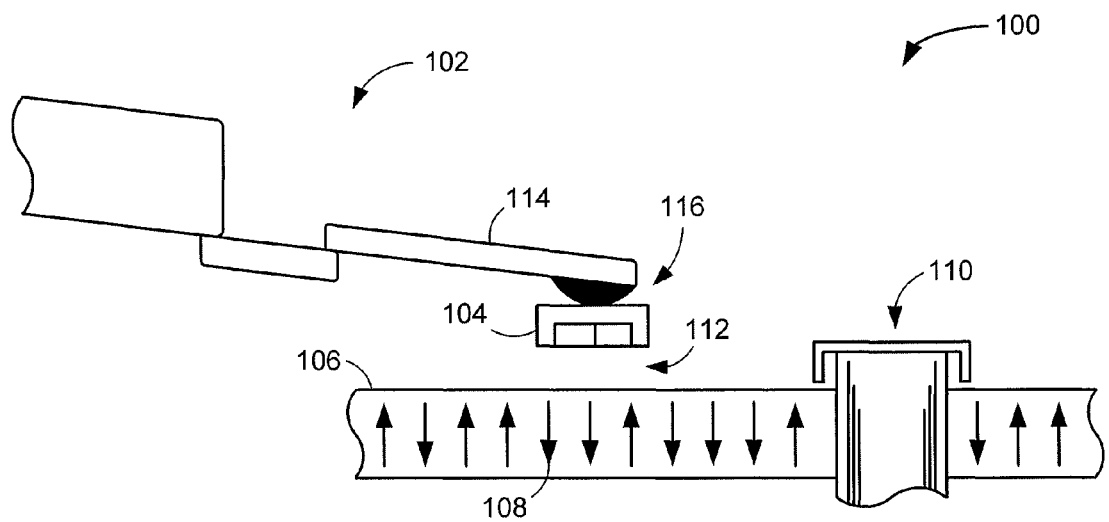
FIG. 1 is a block representation of an exemplary portion of a data storage device in accordance with various embodiments.

FIG. 1 generally illustrates a block representation of a data portion 100 of an example data storage device that can utilize biased side shields in accordance with various embodiments. The data portion 100 is shown in a non-limiting environment having an actuating assembly 102 that positions a transducing head 104 over a magnetic storage media 106 that is capable of storing programmed bits 108. The storage media 106 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a predetermined portion of the media 106.

The transducing head 104 can include one or more transducing elements, such as a magnetic writer and magnetically responsive reader, which operate to program and read data from the storage media 106, respectively. In this way, controlled motion of the actuating assembly 102 causes the transducers to align with tracks (not shown) defined on the storage media surfaces to write, read, and rewrite data.

It should be noted that the term "stack" is an unlimited term within this disclosure that can be one or more magnetic and non-magnetic layers capable of magnetic reading and writing. Throughout the present application, the term "stack" will be understood to mean a component that is constructed with a thickness greater than a predetermined threshold, such as a thickness greater than the width of the component. For example, but not in any way limiting, a side stack can be a single layer of magnetically conductive material while a magnetic stack may be a lamination of magnetic and non-magnetic layers capable of writing or reading programmed data bits.

Figure 2:
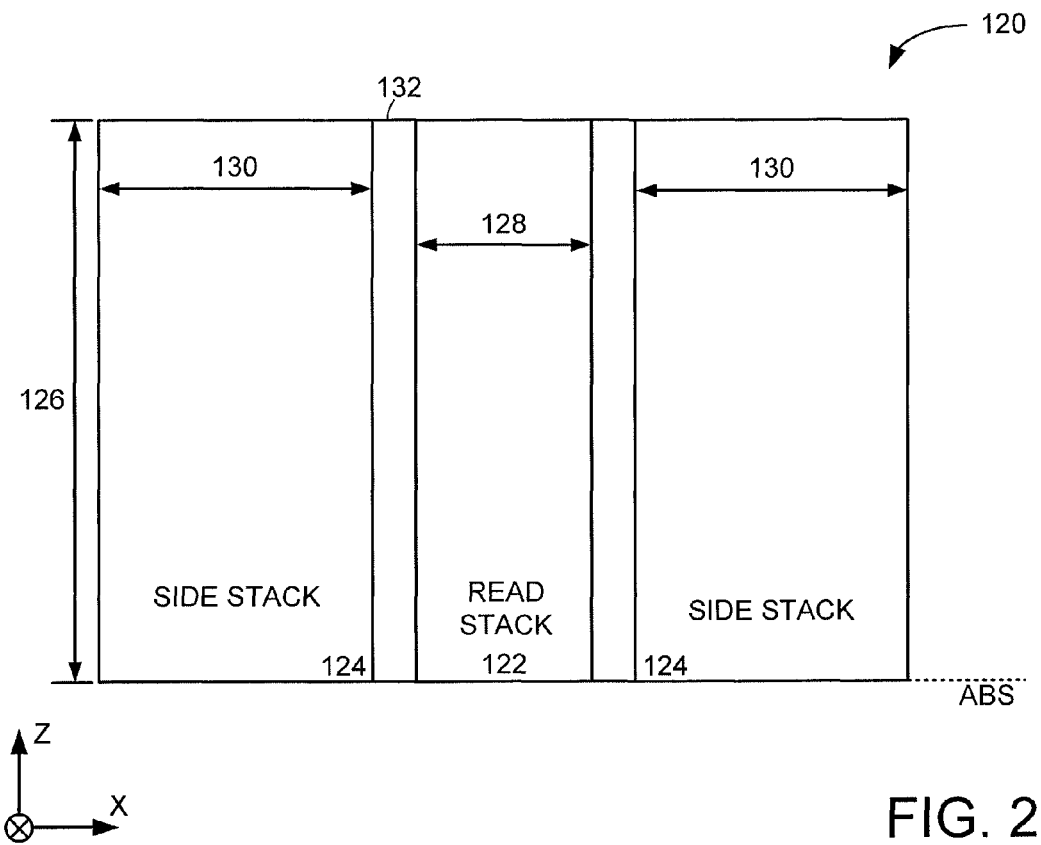
FIG. 2 displays a top view block representation of a portion of an example magnetic element constructed and operated in accordance with some embodiments.

As data capacity and access rates increase with the reduction of transducing head 104 size and the rise of data bit 108 density, side shielding of regions laterally adjacent a magnetic reader or writer can provide increased resolution conducive to differentiating bits from such increased data bit density. FIG. 2 shows a top view block representation of a portion of an example magnetic element 120 capable of being used in the data portion 100 of FIG. 1. The magnetic element 120 has a magnetic stack 122, such as a lamination of magnetic and non-magnetic layers capable of differentiating between external data bits, disposed between side stacks 124 on an air bearing surface (ABS).

The size, material, and type of the magnetic 122 and side 124 stacks are not limited to a particular configuration, but are shown in FIG. 2 with a common stripe height 126 as measured from the ABS along the Z axis. The common stripe height 126 can contrast the dissimilar magnetic stack width 128 versus the side stack widths 130 that may provide optimized magnetic flux shielding to increase data resolution of the magnetic stack 122.

While the side stack 124 may be configured as a solid or laminated structure adjacent to and separated from the magnetic stack 122, the type and purpose of the side stacks 124 is not limited to magnetic shielding. For example, at least one side stack 124 can be a lamination capable of data sensing, such as a magnetoresistive element, spin valve, and solid state memory cell, which has a different width 130 and stripe height 126 compared to the magnetic stack 122. Such side stack 124 configuration can be used to increase data readback rate, sense clearance between the element 120 and a data media, and provide two-dimensional data reading from simultaneous access to adjacent data tracks.

Regardless of the configuration and type of side stack 124, presence of a magnetization close to the magnetic stack 122 may hinder data access reliability and speed as errant magnetization vectors induce instability in portions of the magnetic stack 122. Such errant magnetization can be particularly detrimental in magnetic elements 120 with long stripe heights 126, as defined in some embodiments as having a length greater than the width. Despite the presence of lateral side stacks 124 with tuned dimensions and one or more vertical shields 132, magnetization instabilities can hinder the data resolution of the magnetic stack 122 by adding noise and magnetic asymmetry that cannot be mitigated by the inclusion of additional external shields.

Figure 3:
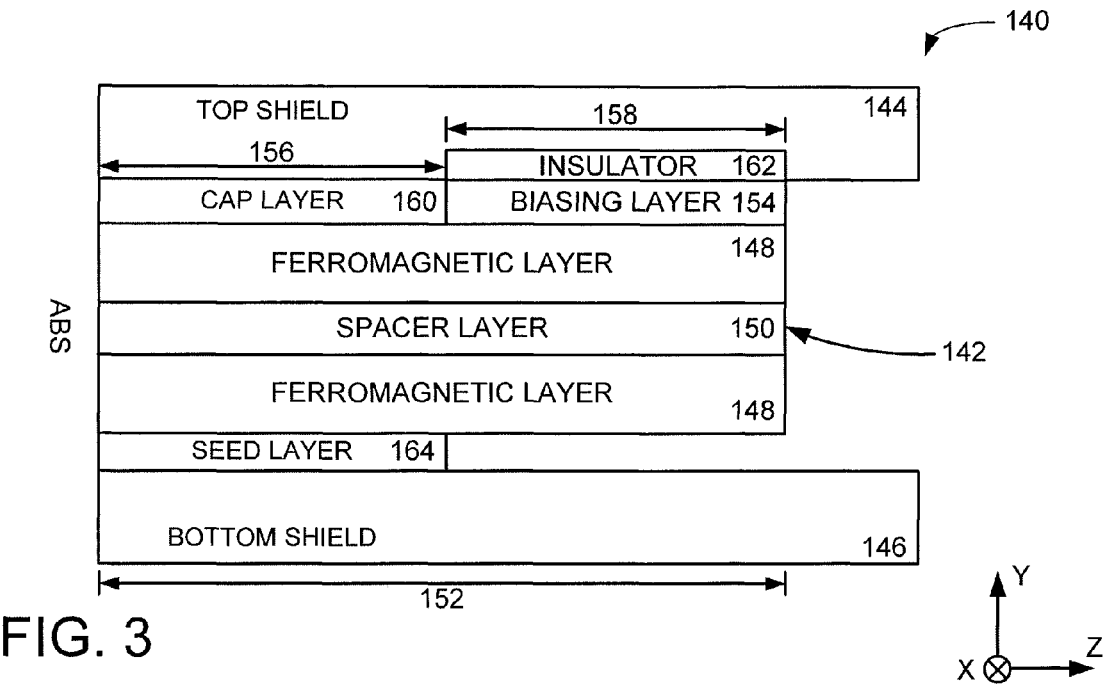
FIG. 3 provides a cross-section block representation of an example magnetic element capable of being used in the data storage device of FIG. 1.

FIG. 3 displays a cross-section block representation of another example magnetic element 140 capable of being used in the data storage device of FIG. 1. The magnetic element 140 has a side shield 142 positioned between top 144 and bottom 146 shields on an ABS. While various embodiments configure the side shield 142 as a single layer of one material, the use of a lamination of ferromagnetic 148 and spacer 150 layers can provide the ability to tune the magnetic shielding properties of the side shield 142, such as by configuring the layers 148 and 150 with different materials, thicknesses, and shapes.

With the introduction of ferromagnetic material into the side shield 142, magnetization can be non-uniform throughout the stripe height 152, which can be detrimental to the magnetic stability and asymmetry of the side shield 142. In some embodiments with long stripe heights 152, a non-uniform magnetization region can be found distal the ABS that has a general magnetization direction perpendicular to the ABS along the Z axis that further increases magnetic asymmetry and can contribute to overall magnetic instability in the magnetic element 140. By coupling a biasing layer 154 to a predetermined region of the side shield 142 that may exhibit a detrimental magnetization direction, such as a transverse magnetic orientation, the detrimental magnetization can be mitigated.

It should be noted that the material, size, and position of the biasing layer 154 in relation to the side shield 142 is not limited to the configuration shown in FIG. 3 and can be adjusted to accommodate the mitigation of errant side shield magnetization. In the embodiments provided by the example magnetic element 140, the biasing layer 154 is constructed as an antiferromagnet (AFM) and/or synthetic antiferromagnet (SAF) positioned to contact one of the ferromagnetic layers 148 of the side shield 142 a predetermined distance 156 from the ABS while having a continuous predetermined stripe height 158 measured from the end of the predetermined distance 156 along the Z axis. Such positioning of the biasing layer 154 away from the ABS can precisely provide bias magnetization to predetermined portions of the side shield 142 without adding size to the magnetic element 140 at the ABS.

The biasing layer 154 is configured with a thickness as measured along the Y axis that matches the cap layer 160 between the top shield 144 and the side shield 142, but is not limited to such an orientation as the biasing layer 154 can be constructed as part of the side shield 142, top shield 144, and bottom shield 146 to provide bias magnetization to the side shield 142. For example, the biasing layer 154 can be positioned partly or wholly within the extent of the top shield 144 in a recess shaped as features like a notch, bevel, and cut-out. Regardless of whether the biasing layer 154 is positioned within the extent of the top shield 142, magnetic isolation of the biasing layer 154 from the top shield 144 can be achieved with the placement of a magnetic insulator 162 between the top shield 144 and biasing layer 154.

While a single biasing layer 154 may be tuned and employed to pin the magnetization of portions of the side shield 142, such configuration is not required as multiple biasing layers 154 can be positioned separated from the ABS on different regions of a single ferromagnetic layer 148 and on separate ferromagnetic layers 148. That is, more than one biasing layer 154 with similar or dissimilar material, stripe height 158, and thickness may contact different portions of the side shield 142, such as on separate ferromagnetic layers 148 proximal the cap 160 and seed 164 layers, respectively.

As an example, a first biasing layer 154 can continuously extend into a notch in the top shield 144 from a first ferromagnetic layer 148 at a first distance from the ABS while a second biasing layer has a thickness that matches the seed layer 164 and does not extend into the continuously uniform cross-section of the bottom shield 146 and contacts a second ferromagnetic layer 148 at a second distance from the ABS that differs from the first distance. With such diverse tuning capabilities for providing bias magnetization to the side shield 142, precise magnetization configurations can be attained that optimize magnetic flux containment by the side shield 142 while increasing resolution of the magnetic element 140.

Figure 4:
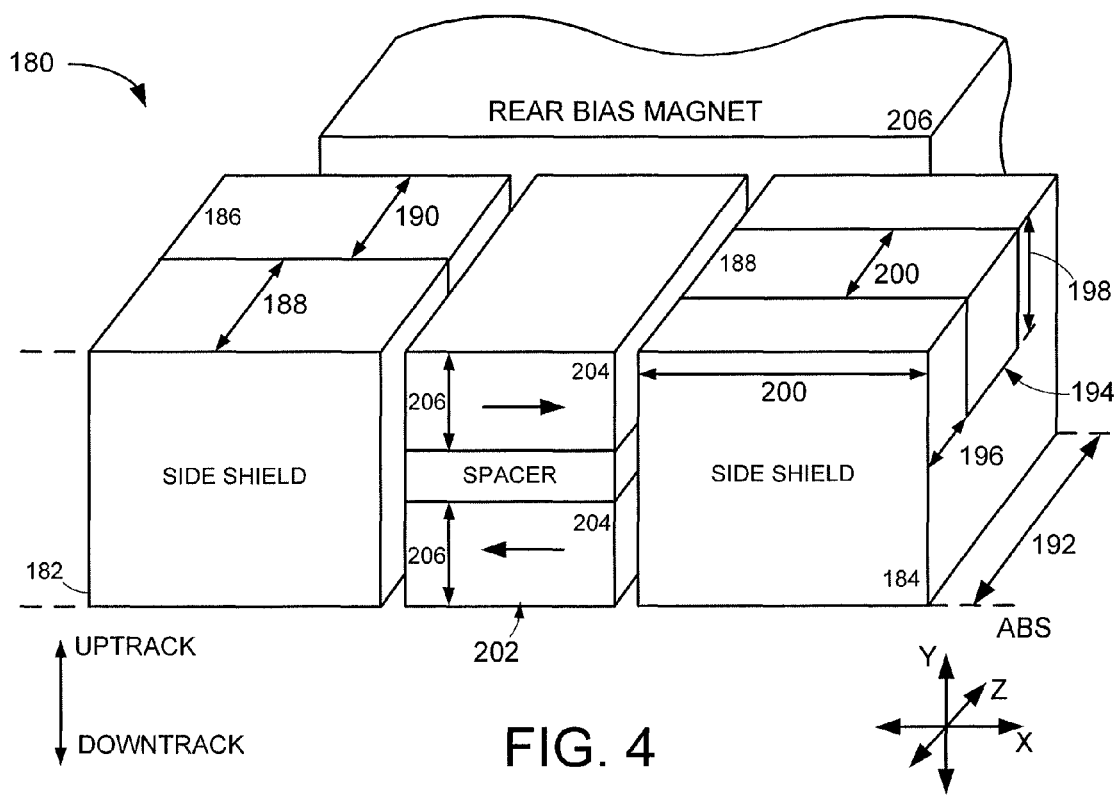
FIG. 4 displays an isometric block representation of a portion of an example magnetic element in accordance with various embodiments.

FIG. 4 illustrates an isometric block representation of a portion of an example magnetic element 180 with side shields 182 and 184 respectively configured with a tuned biasing layer 186 and 188. In side shield 182, a portion of the side shield 182 has been removed and replaced with the biasing layer 186. The position of the biasing layer 186, and removed section of the side shield 182, is tuned to a predetermined position a first distance 188 from the ABS and with a stripe height 190. While not shown, the biasing layer 186 can be configured with a size and shape that substantially matches the amount of material removed from the side shield 182, which results in the side shield 182 having a uniform shape throughout its stripe height 192.

The configuration of the biasing layer 186 may be complemented by the biasing layer 188 being positioned within a recess 194 and areal extent of side shield 184. The distance 196 from the ABS, thickness 198, and stripe height 200 of the biasing layer 188 can each be tuned to provide different size and magnetic characteristics in side shield 184 compared to side shield 182. With the different sizes and positions of the tuned biasing layers 186 and 188 shown in FIG. 4, the side shields 182 and 184 can exhibit differing magnetic characteristics that aid in increasing magnetic stability, asymmetry, and resolution of the magnetic stack 202.

However, tuning of the magnetic element 180 is not exclusively in the realm of the side shields 182 and 184 as the magnetic stack 202 can be constructed in predetermined configurations optimized for use with tuned biasing layers 186 and 188. In FIG. 4, the magnetic stack 202 is configured as a "trilayer" read sensor characterized by magnetically free layers 204 on either side of a non-magnetic spacer. The trilayer configuration can be particularly useful in reduced form factor data storage environments as the lack of a fixed magnetization layer in the magnetic stack 202 minimizes the thickness of the magnetic element 180 at the ABS, in what is known as the shield-to-shield spacing.

The trilayer configuration of the magnetic stack 202 can be further characterized by a separate rear bias magnet 206 that sets the magnetically free layers 204 to default magnetizations, which can be tuned to complement the biasing layers 186 and 188 to provide predetermined magnetization orientation, such as parallel to the ABS along the X axis, in the side shields 182 and 184. As an example of the tuning possibilities of the magnetic stack 202, the thicknesses 206 of the respective free layers 204 can be the same or differ while being chosen to correspond to the width 208 of one or more side shields 182 and 184 on the ABS.

Figure 5:
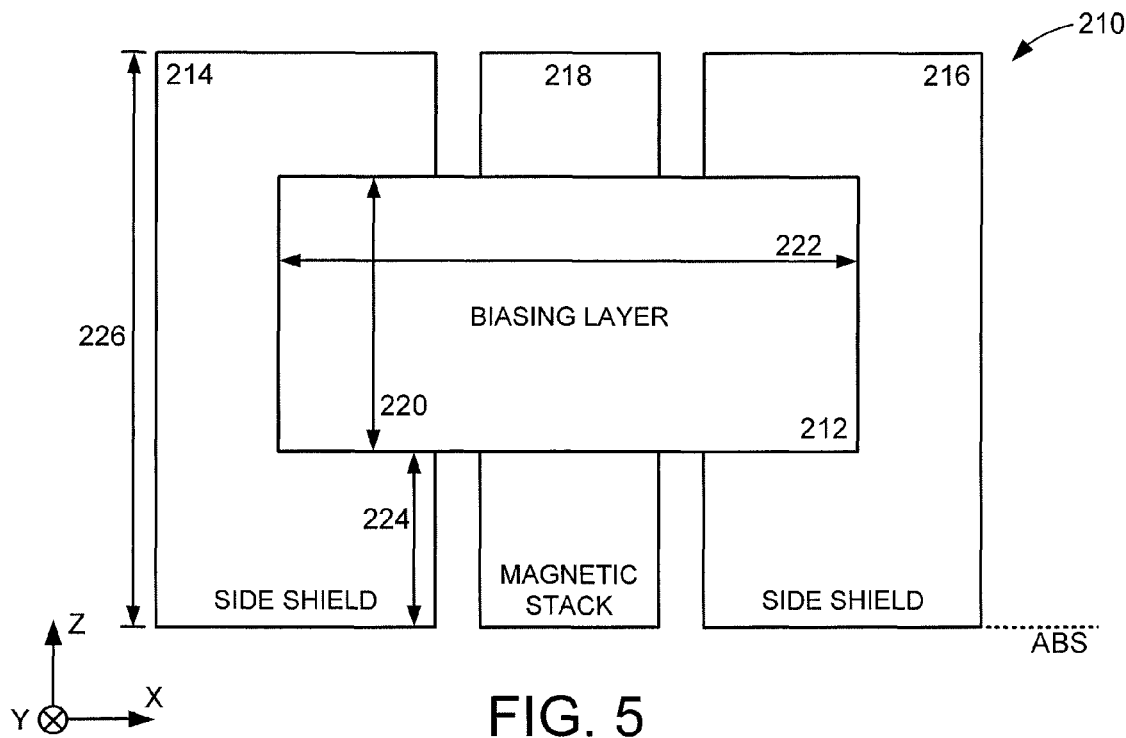
FIG. 5 illustrates a top view block representation of a portion of an example magnetic element constructed and operated in accordance with various embodiments.

FIG. 5 displays a top view block representation of a portion of an example magnetic element 210 tuned in accordance with various embodiments. The single biasing layer 212 continuously spanning from one side shield 214 to another 216 across the magnetic stack 218 illustrates how the magnetization of the magnetic element 210 is not restricted to separate biasing layers corresponding to each side shield.

As shown, the biasing layer 212 has a rectangular shape, defined by a stripe height 220 and width 222, and is positioned a predetermined distance 224 from the ABS. However, such configuration is not limiting as various embodiments configure the biasing layer 212 with a circular, square, or trapezoidal shape that may be tilted with respect to the ABS so that the distance from the biasing layer 212 to the ABS varies along the X axis. The continuous spanning of the magnetic stack 218 and portions of both side shields 216 and 218 may allow for the biasing of portions of the magnetic stack 218, such as one of the magnetically free layers 204 of FIG. 4, in addition or in replacement of a rear bias magnet.

The single biasing layer 212 can be positioned atop the side shields 214 and 216 as well as the magnetic stack 218, such as in a recess of a top shield, but does not preclude the use of additional, and possibly separate, biasing layers positioned distal the ABS to complement the continuous biasing layer 212. Whether the biasing layer 212 is used individually or as part of a collection of biasing layers, the tuned configuration of each biasing layer can provide predetermined side shield and magnetic stack magnetizations that increase magnetic stability of the magnetic element 210 by being positioned proximal to predetermined regions instead of conforming to the shape and size of the side shields and/or magnetic stack.

Figure 6:
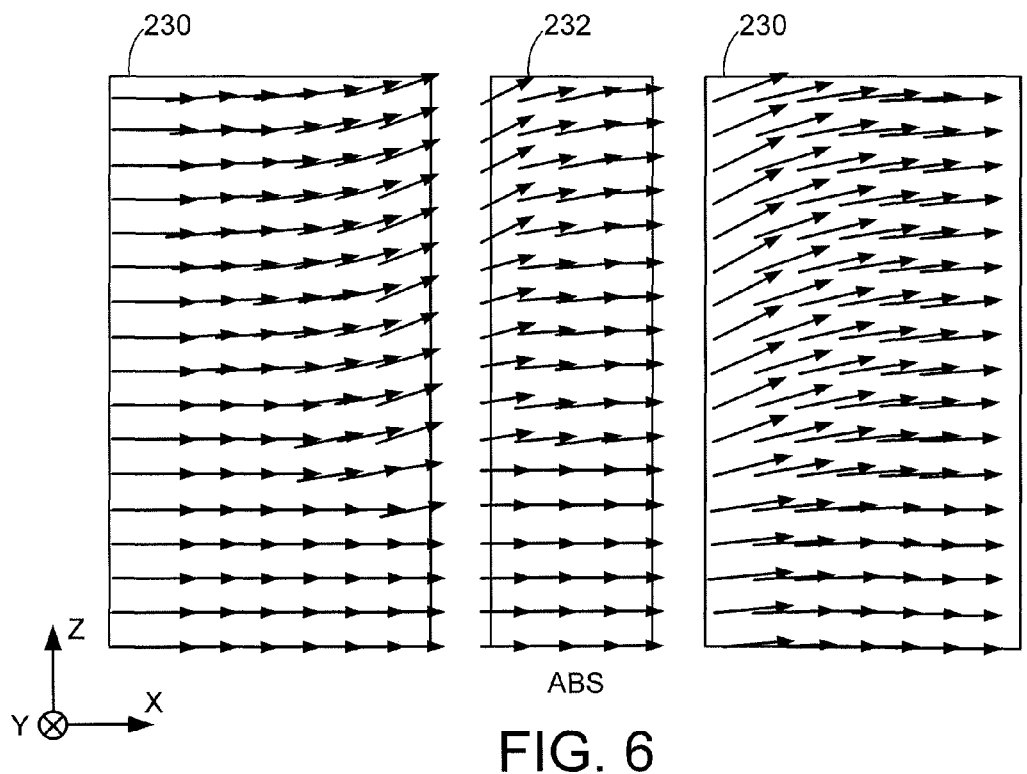
FIG. 6 shows block representations of portions of an example magnetic element operated in accordance with some embodiments.

FIG. 6 generally illustrates a block top view representation of example side 230 and magnetic stacks 232 oriented to predetermined magnetizations as a result of one or more biasing layers being configured in accordance with various embodiments. The orientation of the magnetization of the side shields in a direction substantially parallel to the ABS can induce a predetermined magnetization direction in the magnetic stack 232, especially proximal to the ABS. The magnetizations of the side shields 230 illustrate how variations in magnetization direction can be tuned so not to be detrimental to the magnetic stack 232 magnetization proximal to the ABS.

While the magnetizations shown in FIG. 6 illustrate how the various layers can be tuned in accordance with some embodiments, the magnetizations are not limiting as unlimited magnetization directions and strengths can be provided by positioning one or more biasing layers in contact with the side shields 230, distal the ABS. The general magnetization orientation in predetermined directions throughout the side shields 230 and magnetic stack 232 may be configured, according to various embodiments, with uniaxial anisotropy that further supports the development of magnetization along the predetermined directions.

Figure 7:
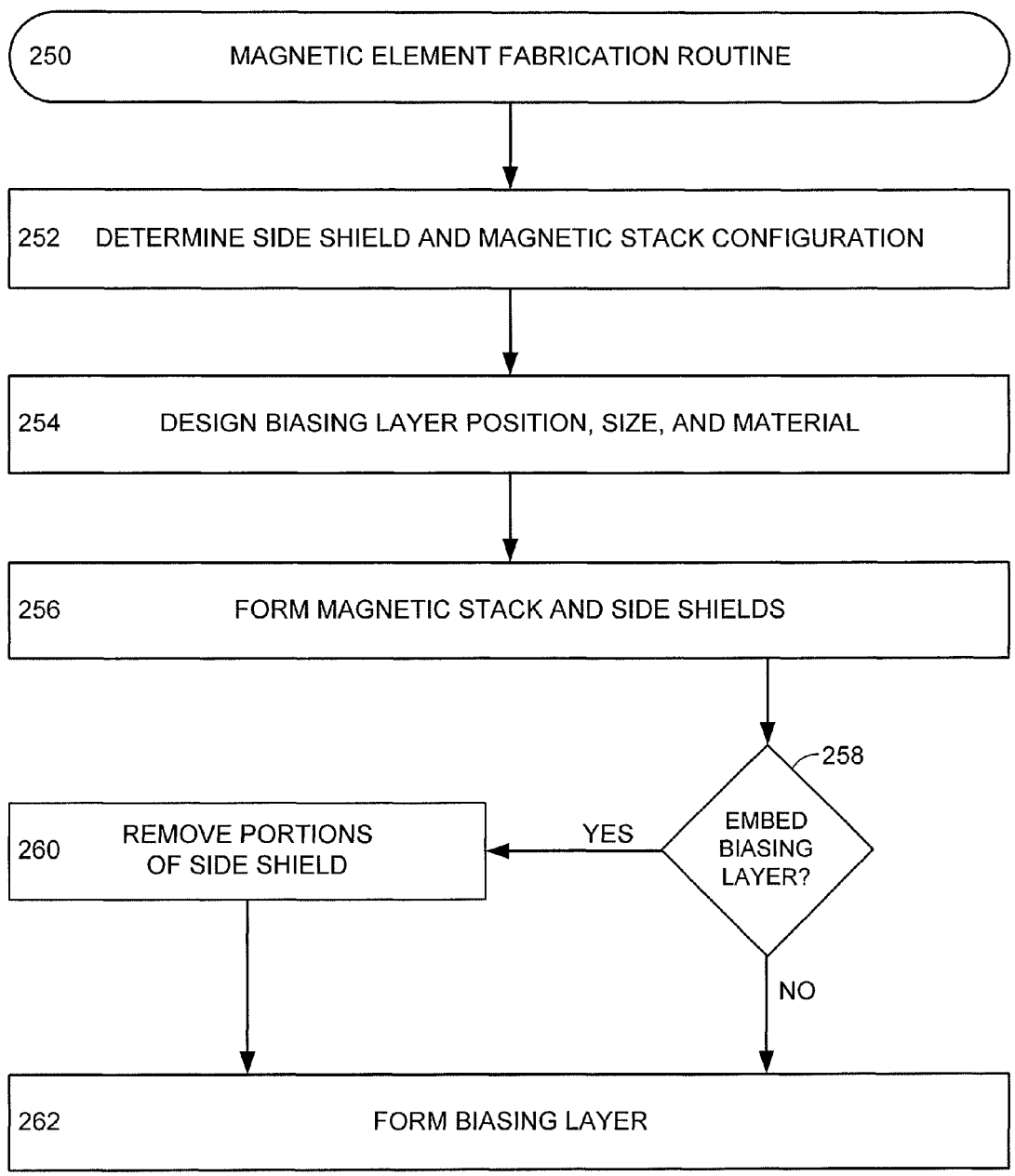
FIG. 7 provides a flowchart illustrating steps of an exemplary magnetic element fabrication routine conducted in accordance with various embodiments.

FIG. 7 provides an exemplary magnetic element fabrication routine 250 conducted in accordance with various embodiments to provide side shield laminations configured to provide flux closure through the top shield. Initially, the routine 250 can determine the configuration of the side shields and magnetic stack in step 252. As discussed above, the stripe height, width, number of layers, and material can be similar or dissimilar for the side shields while the magnetic stack can be constructed as a trilayer, fixed magnetization reference layer inclusive data reading lamination, and data writer with unique or common size and stripe heights.

The determination of the configurations of the respective side shield and magnetic stack in step 252 may be followed by step 254 where at least the position, size, and material of one or more biasing layers is designed. That is, the configuration of the side shields and magnetic stack can provide magnetization characteristics, such as localized regions of transverse magnetization direction, that determine the design of the biasing layer that mitigates those magnetization characteristics. As an example, configuring a side shield as a lamination of magnetic and non-magnetic layers in combination with a long stripe height magnetic stack can correspond to a particular size, position from the ABS, shape, and material for the one or more biasing layers.

Step 256 next forms the predetermined magnetic stack and side shields in concurrent or successive deposition processes conforming to the dimensions and materials determined in steps 252 and 254. With the side shields formed, decision 258 evaluates if the biasing layer designed in step 254 is to be partially or wholly embedded in the side shields and/or magnetic stack. If at least some of a biasing layer is to be embedded, step 260 removes portions of the formed magnetic stack and/or side shields so that the biasing layer formed in step 262 properly conforms to the predetermined configuration. In the event no biasing layer is to be embedded, decision 258 proceeds to step 262 to form the biasing layer without removing any of the magnetic stack and side shields.

It can be appreciated that through the routine 250, a magnetic element with tuned magnetic stack, side shields, and biasing layers can be constructed to provide optimized magnetic stability and asymmetry. However, the routine 250 is not limited as the various steps can be omitted, changed, and added. For example, the routine 250 can further include steps that form and process top and bottom shields that can have notches and recesses that house portions of the biasing layers.

It can be appreciated that the tuning of a magnetic element at least with a biasing layer providing bias magnetization to a side shield. The ability to tune the configuration of the biasing layer, such as with the distance the biasing layer is separated from the ABS, can control side shield magnetization. Moreover, the positioning of the biasing layer distal to the ABS allows for magnetization control while not adding to the shield-to-shield spacing of the magnetic element on the ABS, which allows the magnetic element to be more readily utilized in reduced form factor data storage environments.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising:
   a data reading stack positioned on an air bearing surface (ABS); and
   a side shield contacting the ABS and disposed between the ABS and a biasing layer, the side shield having a width and first stripe height on the ABS, the biasing layer positioned in a recess of the side shield and contained within the width and stripe height of the side shield.

2. The apparatus of claim 1, wherein the magnetic stack configured as a trilayer read sensor comprising first and second magnetically free layers without a pinned reference structure.

3. The apparatus of claim 1, wherein the magnetic stack is configured as a magnetoresistive read sensor comprising at least one fixed magnetization reference layer.

4. The apparatus of claim 1, wherein the biasing layer comprises a synthetic antiferromagnet.

5. The apparatus of claim 1, wherein the side shield comprises a single layer of magnetically conductive material.

6. The apparatus of claim 1, wherein the side shield comprises a lamination of magnetic and non-magnetic layers.

7. The apparatus of claim 1, wherein the biasing layer and side shield share the width as measured parallel to the ABS.

8. The apparatus of claim 1, wherein the side shield has a greater thickness than the biasing layer as measured parallel to the ABS.

9. The apparatus of claim 1, wherein the recess has a second stripe height as measured orthogonal to the ABS and a first thickness as measured parallel to the ABS, the side shield having a second thickness that is greater than the first thickness, the second stripe height being smaller than the first stripe height.

10. The apparatus of claim 9, wherein the biasing layer has a uniform thickness throughout the second stripe height.

11. The apparatus of claim 1, wherein the biasing layer continuously extends to contact both the side shield and magnetic stack.

12. An apparatus comprising:
a data reading stack positioned on an air bearing surface (ABS); and
a side shield contacting the ABS and disposed between the ABS and a biasing layer, the biasing layer positioned in a recess and within an areal extent of the side shield, the areal extent defined by a width, thickness, and stripe height of the side shield, the side shield separating the biasing layer from the ABS.

13. The apparatus of claim 12, wherein the biasing layer continuously contacts the side shield along orthogonal surfaces of the recess.

14. The apparatus of claim 12, wherein a plurality of biasing layers contact different regions of the side shield.

15. The apparatus of claim 12, wherein the biasing layer sets the side shield to a predetermined magnetization oriented substantially parallel to the ABS.

16. An apparatus comprising:
a data reading stack positioned on an air bearing surface (ABS),
first and second side shields each contacting the ABS, the first side shield disposed between the ABS and a first biasing layer, the second side shield disposed between the ABS and a second biasing layer, the biasing layers respectively positioned in recesses of the first and second side shields, the first and second biasing layers being separate and respectively contained within a width, stripe height, and thickness of the first and second side shields.

17. The apparatus of claim 16, wherein the first and second biasing layers have different stripe heights as measured orthogonal to the ABS.

18. The apparatus of claim 16, wherein the first and second biasing layers respectively contact the first and second side shields at a common distance from the ABS.

19. The apparatus of claim 16, wherein the first and second biasing layers respectively contact the first and second side shields at different distances from the ABS.

20. The apparatus of claim 16, wherein the first and second biasing layers have different thicknesses as measured parallel to the ABS.

* * * * *